Jan. 20, 1970  H. I. JOHNSON  3,490,721
GRAVITY STABILIZED FLYING VEHICLE
Filed Nov. 14, 1968  2 Sheets-Sheet 1

Harold I. Johnson
INVENTOR.

BY
ATTORNEY

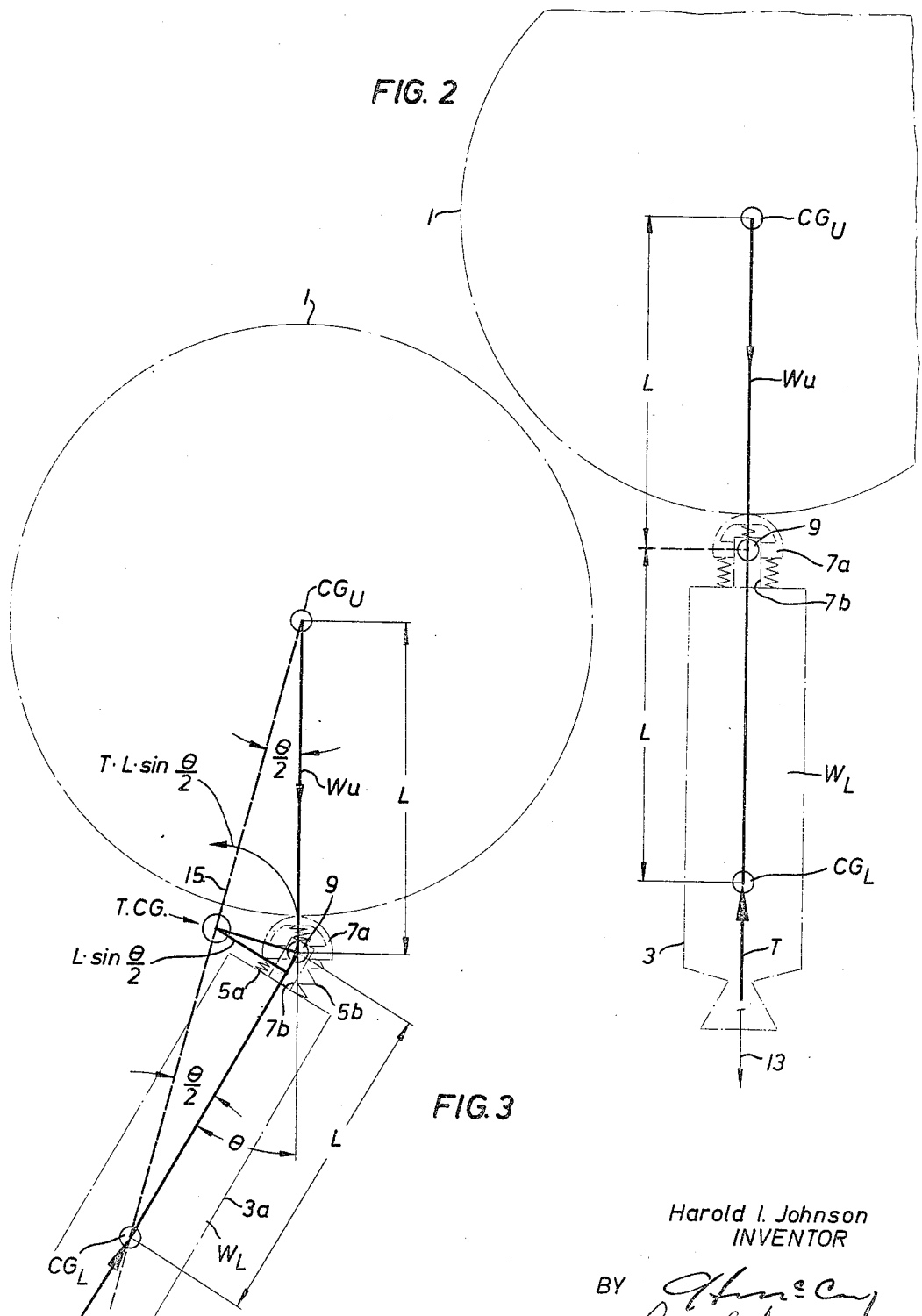

United States Patent Office 3,490,721
Patented Jan. 20, 1970

3,490,721
GRAVITY STABILIZED FLYING VEHICLE
Harold I. Johnson, Seabrook, Tex., assignor to the United States of America as represented by the Administrator of the National Aeronautics and Space Administration
Filed Nov. 14, 1968, Ser. No. 775,877
Int. Cl. B64c 29/00, 17/04
U.S. Cl. 244—23
10 Claims

ABSTRACT OF THE DISCLOSURE

A hovering type flying vehicle for manned or unmanned use in which the lift vector is normally aligned with the direction of the prevailing gravity vector without the need for ancillary stabilizing systems such as gyroscopes or manned guidance. The vehicle consists of an upper body section for containing the payload, a lower body section for housing the lifting engine and its related components, an essentially frictionless universal type joint affixing the upper body to the lower body, and a biasing means between the bodies at the joint which is set to retain the centers of gravity of the bodies along a common axis.

---

The invention described herein was made by an employee of the United States Government and may be manufactured and used by or for the Government for governmental purposes without the payment of any royalties thereon or therefor.

BACKGROUND OF THE INVENTION

This invention pertains to a flying vehicle. More particularly it pertains to flying vehicles having hovering capability without the need for discrete stabilizing means.

One of the more significant obstacles to the effective utilization of hovering type flying vehicles in aerospace, military and commercial applications has been their inherently unstable characteristic in the flying mode. The problem has been clearly exemplified during initial development of the helicopter and various other types of flying platforms and similar vehicles which are supported by reaction generated lift force engines. Heretofore, stability of such hovering type vehicles has been accomplished by use of automatically controlled gyroscopes which sense the vertical and retain the vehicles with respect to a vertical reference plane, manually controlled stabilization systems based upon direct visual cues by a human operator, or kinesthetically controlled systems in which a fixed mechanical factor is used in conjunction with a human stabilizing capability, that is, a human feedback system. Inherent problems and/or disadvantages are present however in each of the aforementioned stabilizing systems.

Manually controlled vehicles, for example, obviously require an onboard human operator. Generally such an operator must be highly trained. Temporary interference with the operator's visual capability will normally result in unbalancing of the vehicle, often causing disastrous consequences. Moreover, in many applications such as interplanetary landings, it is desirable or necessary that the system be totally independent of manned capabilities. On the other hand, automatic stabilization systems are not only expensive but automated control systems used therewith are complex and contain many fallible components, the loss of any one of which would cause failure of not only the stabilization system but of the vehicle and mission itself. Likewise, kinesthetically controlled stabilization systems are subject to the disadvantages of human frailties including both the loss of vision and loss of balancing ability, otherwise known as vertigo.

SUMMARY OF THE INVENTION

In an effort to obviate the aforementioned disadvantages it has been determined that the earth's gravitational field can advantageously be used to maintain a manned or unmanned hovering type flying vehicle in a stable state if the vehicle is constructed of two masses or bodies which are coupled together in spaced apart relationship, and in which the two bodies have their centers of gravity in a particular arrangement with respect to the path or movement of the vehicle and to the gravitational field. By incorporating these relationships into the design of a particular vehicle structure, as described hereinafter, an inherent vertical stability is obtained that counteracts any reasonable persistent external torques which act to disturb or otherwise influence the vertical attitude of the vehicle.

In light of the above, the general purpose of the present invention is to provide a simple hovering type flying vehicle for either manned or unmanned use that is inherently stable in the pitch and roll flying modes without the need for a discrete stabilization system. Another purpose and advantage of the invention is the provision for a hovering vehicle structure having the capability to effectively neutralize the effects of persistent or random external torques thereon. Another feature and advantage of the invention is the provision for a hovering type flying vehicle supported by reaction type lift force engines on the bottom thereof and in which the stability of the vehicle is reliably insured by the structural design and connection of the engine itself to the load carrying section of the vehicle.

BRIEF DESCRIPTION OF THE DRAWINGS

These and numerous other features and advantages of the invention will become apparent upon a reading of the following detailed description and appended claims taken in conjunction with the accompanying drawing, in which:

FIG. 2 is a simplified illustration of the basic mechanisms of the invention while in a static stable condition.

FIG. 3 is a simplified illustration of the basic mechanisms of the invention momentarily subsequent to a destabilizing condition.

DETAILED DESCRIPTION

Figure 1:
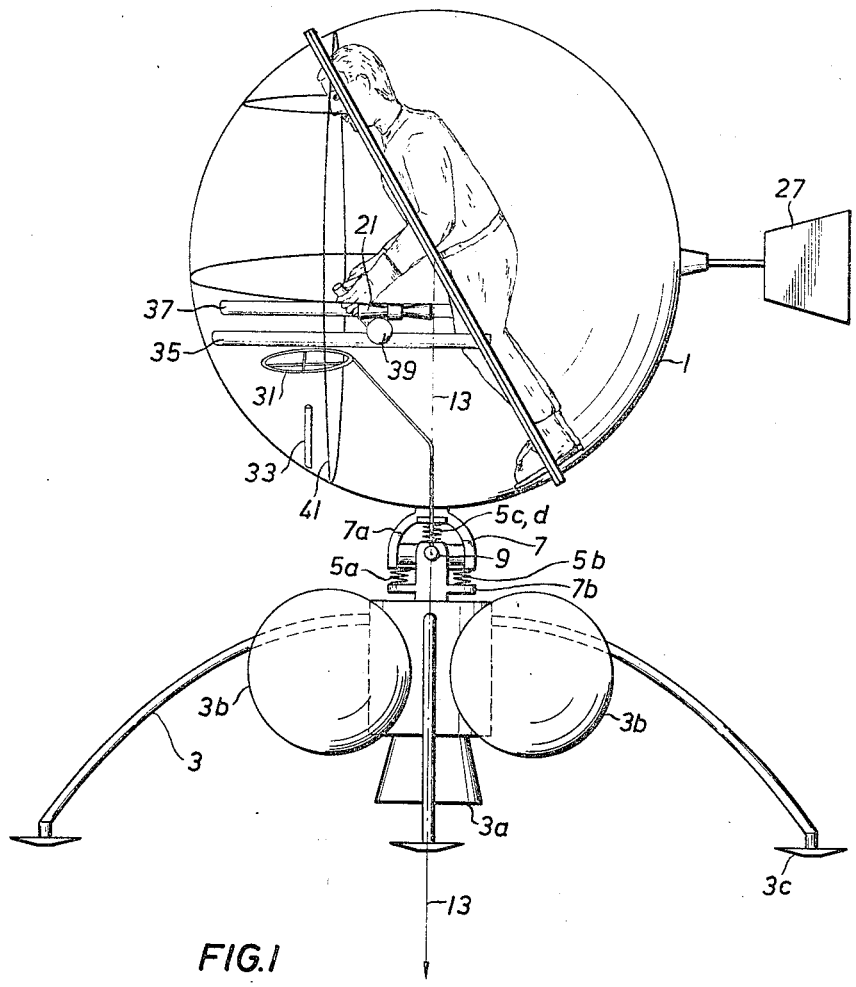
FIG. 1 is a illustration of a vehicle embodying the concepts of the invention.

Referring to FIG. 1, the self-stabilizing vehicle of the invention is characterized by an upper body portion 1 for carrying a passenger or other load and a lower body portion, generally designated 3, consisting of a lifting engine 3a and ancillary components such as fuel tanks 3b and landing gear 3c. The bodies 1 and 3 are maintained in a separated or spaced relationship with respect to each other through the agency of an interconnecting member, generally designated 7, which for exemplary purposes may be shown as a universal type joint in which an upper yoke 7a is connected to upper body 1 while a lower yoke 7b is connected to lower body 3, each of the yokes rotatably engaging one another about a pivot 9. The interconnecting member 7 is idealistically a frictionless universal joint or flexure pivot which may take any number of forms in accordance with the invention. The primary requirement of interconnecting member 7 is that it faithfully transmit between the upper and lower bodies any and all external shear forces which may be imparted to one of the bodies from the other.

Because of the inherently free or uncontrolled movement of the universal joint or other similar interconnecting member 7, a restraining means generally of a flexible nature is utilized in conjunction with it in order to impart to the interconnecting member a restraining or self-correcting tendency to align itself with the centers of gravity of each of the bodies 1 and 3 as explained hereafter. The restraining means is exemplified herein by flexure element or springs 5a–d affixing the yokes to one another at their terminal ends. Normally the masses of the two bodies 1, 3 should be roughly equal, although the inertia of the upper body will generally be much greater than that of the lower body, for reasons explained hereinafter. Also, the relative distances of the center of gravity of the masses of each body from pivot 9 will normally be roughly equal.

Lifting engine 3a is fixedly attached to the lower yoke 7b of interconnecting member 7. In the ideally stable state, as shown in FIG. 2, the thrust vector T of the engine would be normally aligned and coaxial with the prevailing gravity vector 13 which would also be coaxial with the axes of yoke members 7a, b.

In such state it may, for explanatory purposes, be assumed that the weight $W_U$ of the upper body 1 is equal to the weight of $W_L$ of the lower body and that if the bodies were static with respect to a reference surface, the thrust vector T would be equal and opposite to the combined weights. Thus: the total weight $$W_T = W_U + W_L \text{ and } W_T = T$$

Also, if the distance from pivot 9 to the center of gravity $CG_U$ of the upper body is designated L and it is the same as the distance to the center of gravity $CG_L$ of the lower body, then the moment of inertia of the total may be expressed as:

$$I_T = I_U + W_U L^2 + I_L + W_L L^2$$

or $$I_T = I_U + I_L + W_T L^2$$

The stability tendency of the vehicle may be demonstrated by reference to FIG. 3 wherein there is shown the condition of the vehicle and forces acting thereon when the thrust vector T is not aligned with the gravity vector of the upper body. At such a time the vehicle is temporarily out-of-balance or out-of-trim. Here the thrust vector T is offset with respect to the gravity vector of the upper body by an angle theta $\theta$. The actual center of gravity T.C.G. of the total vehicle is shifted outwardly from the original coaxial line including the thrust vector T and prevailing gravity vector 13 to a point lying on a straight line 15 connecting the centers of gravity of the upper and lower bodies. Then $\theta/2$ defines the included angle between thrust vector T and straight line 15.

It will be readily recognized from the relative positions of the bodies in FIG. 3 that the upper body 1 will tend to move in a clockwise direction by reason of that body's weight $W_U$ acting about the T.C.G. However, due to the universal connection between the bodies, a restoring moment will oppose clockwise movement of the upper body. The counterclockwise moment tending to restore the entire vehicle to a verticle attitude is readily defined by multiplying the thrust T by an arm which is normal thereto and which intersects the T.C.G. Such line is designated $$L \sin \frac{\theta}{2}$$

wherein it is assumed that $$\cos \frac{\theta}{2} = 1$$

the counterclockwise restoring moment may then be designated $$T \cdot L \cdot \sin \frac{\theta}{2}$$

As long as the counterclockwise restoring moment $$T \cdot L \cdot \sin \frac{\theta}{2}$$

is equal to or greater than the clockwise moment resulting from the gravity vector of the upper body about the T.C.G. the vehicle may hover or translate in a stable condition. This will normally be true because the thrust force will normally be about twice the weight of the upper body. The inherent tendency of the vehicle to seek a stable state whenever the thrust is offset with respect to the overall center of gravity T.C.G. is further enhanced by the forces exerted by flexure elements 5a–d. In FIG. 3, element 5a for example will resist further angular movement between the two bodies due to its unnatural compressed state while element 5b, being in tension, will tend to draw the bodies towards alignment. Thus calculated pre-stressing of the flexure elements 5a and b creates a continuous tendency to move the bodies into alignment during a short period oscillation mode. It will similarly be recognized that the flexure elements of 5c, 5d of the upper portion of the interconnecting member 7 will tend to resist destabilizing moments in planes normal to the plane of the drawing as illustrated by elements 5a and 5b. Also it will be recognized that destabilizing torques existing in other planes will be resisted by the combined action of all of the flexure elements of interconnecting member 7, and that the tendency of the entire structure is to keep the lift vector of lower body 3 aligned with the direction of the prevailing gravity vector.

In addition to the above, stability is imparted to the vehicle by the high aerodynamic drag which characterizes the upper body. Since the drag is substantially greater than that of the lower body, the vehicle will, in a gravity environment, when misaligned, always tend to return the upper body-lower body orientation to a vertical attitude. The sole circumstance therefore in which the vehicle will not tend to produce a stability restoring moment will be when the upper body center of gravity and the center of gravity of the lower body are both aligned with the thrust vector and when the prevailing gravity vector is coaxial with the thrust vector. Under such conditions, the vehicle is statically and dynamically balanced.

In flying the vehicle of the subject invention, the operator can achieve fore and aft or sideways translation in a number of ways. For example, by shifting his weight slightly he can manipulatively control and/or cause the vehicle to slide off in the direction of the weight shift. This may be visualized by reference to the drawing wherein it may be seen that if the operator should move his body forward and hence the center of gravity of the upper body 1 forward, a counter-clockwise torque will be imparted to the upper body, which torque will be rectified by operation of the continuous thrust of the engine 3a in conjunction with the interconnecting member 7 and flexure elements 5a–d. Horizontal translation control input magnitude may be displayed by utilization of visual flight indicators such as a simple cross-hair marker 31 and eye bar 33, the former of which is fixedly connected to the lower body and the latter of which is fixedly connected to the upper body. Also connected to the upper body are a pair of parallel control bars 35, 37 on which is movably disposed a translation bar 39 which is slidably affixed to the parallel control bars by any appropriate means such as a T'ed channel construction. In order to accomplish forward translational movement of the vehicle the operator need only to shift his weight forwardly by moving translation bar 39 outwardly along the parallel control bars 35, 37 while at the same time referencing his control input magnitude in terms of angle generated between the upper and lower bodies by means of the hairline 31 and eye bar 33. For control purposes the upper body may further include reference lines 41 such as painted on the interior thereof so that the operator may be cognizant of the relative angles of the vehicle in pitch, yaw, and roll with respect to the ground as shown by the horizon.

Translational movement of the vehicle may be accomplished by methods other than the operator shifting the center of gravity of the upper body. Similar translation may be accomplished by angular movement of the lower body intentionally caused by an operator in the upper body. Such a control system may be envisaged in the form of a plurality of flexible control lines each of which may be tied at one end to the lower body proximate to the operator. The lines would be tied to the lower body every 90° thereabout so that the operator may, by selective pulling of the lines, cause the thrust engine or lower body 3 to be misaligned with the upper body. As a result the upper body would tend to destabilize in the direction of the line which was pulled thus causing the vehicle to translate in such direction. Due to the inherent stability characteristics of the structure, however, the vehicle would constantly tend to strive for the stable position as it is translating and therefore soon reach a steady translational speed.

It is thus seen that control of the vehicle can be accomplished either by displacing the center of gravity of the upper body with respect to the lower body through movements of the operator or by displacing the center of gravity of the lower body and the thrust forces therefrom with respect to the uper body by utilization of a control line system operated from within the upper body. In either event the vehicle is capable of stable operation over indefinite periods of time whether occupied or unoccupied, since stability of the vehicle is in no way produced by the operator. It will be readily recognized that if the vehicle is of the unmanned variety, translational movement can be accomplished by remote operation of conventional reaction jets 21 appropriately located on the vehicle. Similarly, translational movement can be accomplished by remote gimbaling of the main lift engine or lower body 3. Additional control of the vehicle can be effected by the attachment of a vertical fin 27 at the "rear" of the vehicle to give it a positive stability in the azimuth or yaw plane, assuming flight is to be accomplished in an atmospheric environment. Again, azimuth control of the vehicle operated in a vacuum can be effected by firing opposing jets 21 on opposite sides of the vehicle simultaneously.

Many diverse uses are contemplated for the instant invention. For example, the vehicle might be employed as a short-haul VTOC air-taxi or air-bus for ferrying travelers from the middle of cities to intercontinental air terminals. The vehicle might be used as a lunar flying mobility vehicle or as a self-landing unmanned or manned interplanetary vehicle. The vehicle might be used to give instant mobility to the foot soldier. It could be used for transportation of material or personnel to otherwise inaccessible places on earth or to carry loads to elevated locations. It could further be used as a crop sprayer or duster in which the vehicle would be towed behind a tractor at the end of an umbilical line. An air pump on the tractor would keep it hovering with its jets pointed downwards. The chemicals would be introduced into the air stream at the tractor. As such, particular advantage of the vehicle would be derived from the enhanced distribution of chemicals over the terrain. Also the vehicle could even be used as a platform for a camera for the taking of pictures from above without the use of a ladder or other rigid supporting means.

It will be understood that various changes may be made in the form, details, arrangements and proportions of the parts disclosed herein without departing from the scope of the invention and from the spirit of the appended claims. That which is desired to be secured by United States Letters Patent is:

1. A hovering type, thrust supporting flying vehicle, having inherent stability characteristics and translational ability while the gravity vector is substantially coaxial with the thrust vector thereof comprising:
   an upper body,
   a lower upwardly directed, thrust producing body with said lower body having lower aerodynamic resistance than said upper body,
   connection means coupling said upper and lower bodies for faithfully transmitting forces therebetween,
   and biasing means across said connection means to provide the exertion of moments tending to coaxially align the two bodies with one another.

2. The hovering type flying vehicle of claim 1 wherein the upper body is so constructed that its center of pressure in normal flight is always above the connection means whereby the inherent tendency of the bodies when dynamically free in a gravity environment is for the lower body to stabilize below the upper body.

3. The hovering type flying vehicle of claim 2 wherein said upper body includes control means for physically displacing the center of gravity of either body from alignment with the thrust vector thereby effecting translational movement of the vehicle.

4. The hovering type flying vehicle of claim 1 wherein said upper body includes biasing control means for applying flexible forces tending to displace the centers of gravity of said bodies from alignment with the thrust vector thereby effecting translational movement of the vehicle.

5. The hovering type flying vehicle of claim 3 wherein there is means for directly and continuously displaying to the operator relative angular motion between the upper body and lower body about the lateral axis and the fore-and-aft axis of the connection means.

6. The hovering type flying vehicle of claim 5 wherein the upper body is substantially in the form of a sphere with at least a portion of the forward hemisphere being formed of transparent material to provide visibility to the operator.

7. The hovering type flying vehicle of claim 6 wherein there is at least one horizontal line on the transparent portion of the upper body to provide the operator with a continuous display of the pitch and roll attitude of the vehicle.

8. The hovering type flying vehicle of claim 6 wherein there is at least one vertical line on the transparent portion of the upper body to provide the operator with a continuous display of yaw attitude of the vehicle.

9. The hovering type flying vehicle of claim 2 wherein there is a vertical fin at the rear of the upper body to provide directional stability in the yaw plane.

10. The hovering type flying vehicle of claim 1 wherein the upper body is provided with a plurality of jets to provide control in the yaw plane.

References Cited

UNITED STATES PATENTS

| 2,417,896 | 3/1947 | Zimmerman. |
| 3,031,154 | 4/1962 | Roberson et al. |
| 3,191,316 | 6/1965 | Dryden _____ 244—23 X |

MILTON BUCHLER, Primary Examiner

T. W. BUCKMAN, Assistant Examiner

U.S. Cl. X.R.

244—4, 76; 180—1.6